US011095464B2

(12) United States Patent
Zondag et al.

(10) Patent No.: US 11,095,464 B2
(45) Date of Patent: Aug. 17, 2021

(54) OPTICAL FIBRE ENHANCED POE NETWORK

(71) Applicant: SIGNIFY HOLDING B.V., Eindhoven (NL)

(72) Inventors: Eduard Gerhard Zondag, Eindhoven (NL); Harald Josef Günther Radermacher, Eindhoven (NL); Matthias Wendt, Eindhoven (NL); Ulrich Boeke, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/623,415

(22) PCT Filed: Jun. 12, 2018

(86) PCT No.: PCT/EP2018/065497
§ 371 (c)(1),
(2) Date: Dec. 17, 2019

(87) PCT Pub. No.: WO2018/234101
PCT Pub. Date: Dec. 27, 2018

(65) Prior Publication Data
US 2020/0213141 A1    Jul. 2, 2020

(30) Foreign Application Priority Data

Jun. 22, 2017 (EP) ...................................... 17177343

(51) Int. Cl.
*H04B 10/80* (2013.01)
*H04Q 11/00* (2006.01)
(Continued)

(52) U.S. Cl.
CPC ............ *H04L 12/10* (2013.01); *G02B 6/4472* (2013.01); *H04B 10/808* (2013.01); *H04Q 11/0071* (2013.01)

(58) Field of Classification Search
None
See application file for complete search history.

(56) References Cited

U.S. PATENT DOCUMENTS

2002/0126967 A1* 9/2002 Panak ................ H04B 10/1127
385/101
2008/0214140 A1* 9/2008 Caveney ............ H04L 41/0803
455/402

(Continued)

FOREIGN PATENT DOCUMENTS

WO    2013107015 A1    7/2013
WO    2016/116690 A1   7/2016

OTHER PUBLICATIONS

IEEE Standard 802.3atTM-2009, "Part 3: Carrier Sense Multiple Access with Collision Detection (CSMA/CD) Access Method and Physical Layer Specifications", Oct. 30, 2009, pp. 1-141.

(Continued)

*Primary Examiner* — Li Liu

(57) ABSTRACT

The present invention relates to a Power over Ethernet system (100) which supports additional optical communication via optical fibres. The powered devices (d1, d2, d3) may comprise circuitry to process optical signals, in particular triggering activation of the powered device (d1, d2, d3) after being in a low power state. The power supplying devices (s1-s6) may relay optical signals via direct optical paths. Optical paths in the network may improve timing accuracy of applications. The overall power consumption of the system may be improved in particular during low activity situations in which the system is primarily used for (Continued)

data communication. The additional optical communication paths may provide redundant paths and thus may increase the network's robustness.

10 Claims, 2 Drawing Sheets

(51) Int. Cl.
  *H04L 12/10* (2006.01)
  *G02B 6/44* (2006.01)

(56) References Cited

U.S. PATENT DOCUMENTS

| | | | | |
|---|---|---|---|---|
| 2010/0217965 | A1* | 8/2010 | Wolff | H04L 12/12 |
| | | | | 713/2 |
| 2011/0191608 | A1 | 8/2011 | Vetteth | |
| 2012/0243871 | A1* | 9/2012 | Huang | H04W 52/0296 |
| | | | | 398/58 |
| 2012/0319468 | A1* | 12/2012 | Schneider | H04L 12/10 |
| | | | | 307/1 |
| 2013/0236188 | A1 | 9/2013 | Hung et al. | |
| 2014/0075213 | A1* | 3/2014 | He | G06F 1/26 |
| | | | | 713/300 |
| 2014/0258742 | A1* | 9/2014 | Chien | H04L 12/10 |
| | | | | 713/300 |
| 2015/0023660 | A1 | 1/2015 | Kramer et al. | |
| 2015/0078740 | A1* | 3/2015 | Sipes, Jr. | H04B 10/808 |
| | | | | 398/16 |
| 2015/0244535 | A1* | 8/2015 | Chen | H04L 12/40045 |
| | | | | 713/300 |
| 2015/0333918 | A1* | 11/2015 | White, III | H04L 12/10 |
| | | | | 713/300 |
| 2016/0149713 | A1* | 5/2016 | Wendt | H04L 12/10 |
| | | | | 307/1 |
| 2016/0164688 | A1* | 6/2016 | Yseboodt | H05B 47/18 |
| | | | | 307/1 |
| 2016/0294500 | A1* | 10/2016 | Chawgo | H04B 10/808 |
| 2016/0299561 | A1 | 10/2016 | Middleton et al. | |
| 2016/0334856 | A1* | 11/2016 | Yseboodt | H04L 12/40045 |
| 2017/0104421 | A1* | 4/2017 | Chiu | H02M 3/33507 |
| 2017/0117971 | A1* | 4/2017 | Sipes, Jr. | G02B 6/4246 |
| 2017/0199794 | A1* | 7/2017 | Byers | G06F 1/263 |
| 2018/0176026 | A1* | 6/2018 | Yseboodt | H02J 3/02 |
| 2018/0287772 | A1* | 10/2018 | Kloper | H04W 64/003 |
| 2018/0340840 | A1* | 11/2018 | Bullock | G01K 13/00 |
| 2019/0257873 | A1* | 8/2019 | Sholtis | G01R 31/44 |

OTHER PUBLICATIONS

Website: http://www.patchsee.com/.

* cited by examiner

OPTICAL FIBRE ENHANCED POE NETWORK

CROSS-REFERENCE TO PRIOR APPLICATIONS

This application is the U.S. National Phase application under 35 U.S.C. § 371 of International Application No. PCT/EP2018/065497, filed on Jun. 12, 2018, which claims the benefit of European Patent Application No. 17177343.5, filed on Jun. 22, 2017. These applications are hereby incorporated by reference herein.

FIELD OF THE INVENTION

The present invention relates to Power over Ethernet (PoE) systems, the cables and devices used therein for transmission of data and control information. More particular, the present invention relates to PoE systems which enable optical communication.

BACKGROUND OF THE INVENTION

PoE systems that may input, transport and output a variety of power options along PoE lines or otherwise are used for many application networks, in particular—but not limited to—lighting networks. PoE is described in the IEEE802.3af/at standard and is currently being extended towards 4-pair power in the IEEE Task Force P802.3bt. PoE is intended to supply power voltage levels of 40 V to 48 V from Power Sourcing Equipment (PSE) to Powered Devices (PDs), alongside data lines for control and communication purposes. A PSE device is also referred to as PoE switch.

In PoE lighting systems PDs may be light sources, user interface devices and sensors. The PSE is typically powered from a mains power source, such as according to the IEC/TR 60083 standard.

Traditional PoE systems will transport data and power over a network and its end points, hence among PSEs and PDs. PoE systems have low energy efficiency when transmitting only data but no power.

An emergency operation of a PoE system based on an emergency power supply in a case utility electricity is not available is expensive, since distributed PoE PSEs in a building require a complex electric emergency power infrastructure.

Furthermore, the submission of data signals via electrical wires and over a plurality of relay devices may be too slow and error prone in some conditions.

It is thus an object of the present invention to provide a powered device, a power supplying device, a cable connector and a network system supporting optical and electrical signal transmission as well as power supply that provide for efficient and robust signal transmission.

US 2015/078740 A1 discloses a fiber optic-based communications network comprising: a power insertion device; the hybrid fiber/power cable; and the connection interface device, configured to provide an interface for connection to an end device via a power over Ethernet (PoE)-compatible connection and to provide optical to electrical media conversion for data transmitted from the power insertion device to an end device via the hybrid fiber/power cable and the PoE-compatible connection.

SUMMARY OF THE INVENTION

The object is solved by a powered device, a power supplying device, a cable connector and a network system according to the independent claims.

The provision of optical fibres co-located along Ethernet or PoE cables and respective PSE/PD circuitry to enable optical communication through a PoE network infrastructure allows efficient communication within the network, possibly without powering one or more intermediate PSEs (direct optical paths). Communication and synchronization over optical fibers may be independent from PoE communication which offers energy, material and installation cost savings beside improved timing behavior and additional communication paths.

In a first aspect of the present invention a powered device for a Power over Ethernet system is provided, comprising a first port to receive transmissions via electrical wires, a second port to receive optical signals, and circuitry to process a command received with an optical signal. The transmissions received via the first port may be power and/or data transmissions. The first port and the second port may be provided as separate hardware ports, e.g. separate female connectors. Such a design provides the advantage that the powered device could be used with the conventional signaling if there are no fibre enhanced cables available in the network. Alternatively, a single female connector may receive both the electrical transmissions wherein there may be several pins for power and/or data transmission and at least one further pin for the optical signal.

In an embodiment the powered device operates in a low power state and the command received with the optical signal is a wake up signal and the circuitry is configured upon receipt of the wake up signal to change the power state of the powered device and submit a power request to initiate power negotiations of the powered device. In the low power state, the powered device does not need to keep the communication interface for electrical signaling via the electrical wires powered. It may only activate the respective circuitry when being triggered via optical signals. Thus, the energy savings during a low power mode of the powered device may be improved.

In an embodiment the powered device further comprises a battery to provide power to the powered device upon receipt of the wake up signal and during power negotiations. In order to be able to provide immediate feedback after receiving a trigger signal via the optical fibre, the powered device may be powered via a battery, preferably a rechargeable battery, until negotiations with the serving PSE are finished and the powered device is powered over the electrical wires. This provides an improved start-up reaction. For instance, if the powered device is a lighting device and the trigger indicates to switch the light on, the lighting device may switch on immediately even though power negotiations are not yet finished.

In a further aspect of the present invention, a power supplying device for a Power over Ethernet system is provided, comprising a first port to receive transmissions via the electrical wires, a second port to send transmissions via the electrical wires, a third port to receive optical signals, and a fourth port to transmit optical signals, wherein the third and the fourth ports are directly linked to each other. By providing a direct optical path between the third and the fourth ports, the power supplying device may relay optical signals without requiring any electrically powered circuitry. Thus, the power consumption of the power supplying device may be reduced.

In an embodiment the power supplying device further comprises circuitry to split an optical signal received via the first optical port and transmit the signal via a second and third optical port. That way optical signals can be efficiently provided to a plurality of end nodes, for instance in a broadcast manner. The circuitry may be programmed, controlled or monitored by a remote device connected via data communication via the electrical wires or via the optical link.

In an embodiment the power supplying device further comprises a third optical port to receive an optical signal and circuitry to combine optical signals received via the first and third ports and transmit the combined signal via the second optical port. Preferably, an optical signal is received via the first port wherein the signal has a first frequency or first pattern. An optical signal received via the second port may have a second frequency or second pattern, wherein the first and second frequencies/pattern may be the same or different. Both signals may be combined and output simultaneously via the third port with a third frequency or third pattern, wherein the third frequency or third pattern may be the same as the first and/or second frequency or pattern or can be any combination thereof. The circuitry may be programmed, controlled or monitored by a remote device connected via data communication via the electrical wires or via the optical link.

In a further aspect of the present invention a network system supporting optical and electrical signal transmission is provided comprising a power supplying device and a powered device according to previously discussed aspects of the invention, wherein the power supplying device is adapted to relay an optical signal to the powered device.

In an embodiment the system comprises a plurality of powered devices including the powered device and a plurality of power supplying devices including the power supplying device, wherein the plurality of powered devices and the plurality of power supplying devices are connected via electrical connections according to a first network topology and connected via optical connections according to a second network topology. The second network topology may preferably be different from the first network topology. By providing redundant paths throughout the network, the robustness of the network may be improved. A single failing node in a tree like structure for example could cut off all dependent nodes. By using a second network topology for the optical communication, the dependent nodes may still be reached.

In an embodiment the system comprises a plurality of powered devices including the powered device, and the control information is provided simultaneously to the plurality of powered devices via the optical fibre. Since optical communication suffers less from losses than electrical signal communication, optical signals may be provided over longer distances. Furthermore, fibers are immune to electromagnetic interference. Thus, optical signals may provide better signal transmission to a plurality of powered devices spread over a large area, for instance lighting devices within a building which should be switched on/off simultaneously.

In a further aspect of the present invention a cable connector for a cable comprising electrical wires for power and data communication and optical fibres for data communication is provided, comprising a first set of pins connectable to the electrical wires and a second pin connected to the optical fibre wherein the second pin is made of a transparent material.

In an embodiment the first set of pins and the second pin are comprised in a single transparent plug.

In an embodiment the first set of pins is comprised in a first plug compliant with RJ45 format, and the second pin is comprised in a second plug.

It shall be understood that the powered device of claim 1, the power supplying device of claim 4, the network system of claim 8 and the cable connector of claim 13, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
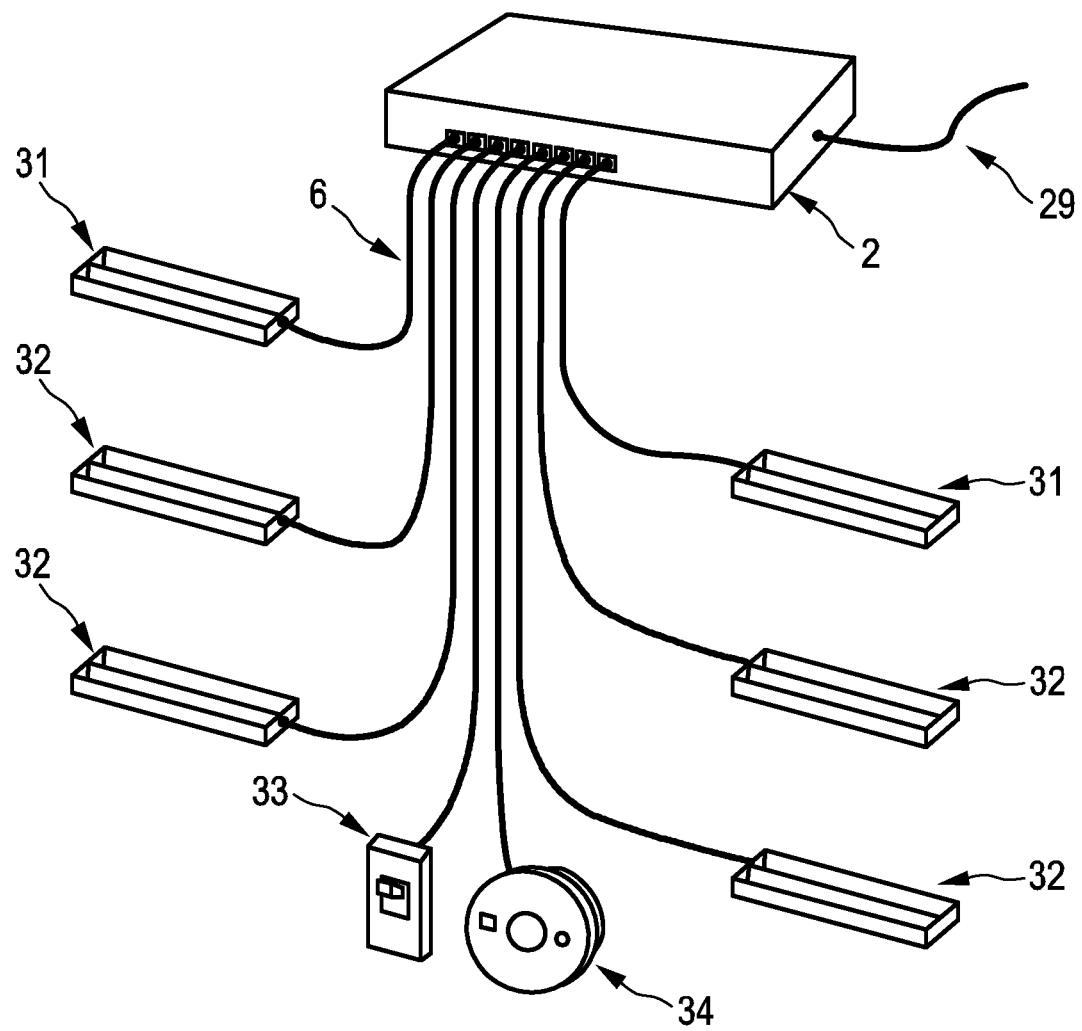
FIG. 1 shows exemplary and schematically application components of a lighting system according to an embodiment of the present invention.

FIG. 1 shows exemplary and schematically application components of a lighting system according to an embodiment of the present invention. The power supplying device 2, also referred to as power sourcing equipment PSE herein below, is typically powered from a mains power source via cable 29. Connected thereto via cables 6 are a plurality of powered devices PDs 31-34, such as light sources 31-32, user interface device 33, such as—but not limited to—a control panel for activation and dimming, and sensors 34, such as—but not limited to—a passive infrared sensor. Traditional PoE systems will transport data and power over the cables 6 to the respective end points. Thus, they are limited to transmit data by means of electrical signals. In this embodiment of the present invention the cable is provided with additional optical fibres alongside the Ethernet cables to exploit optic signal transmission for control, synchronization and data communication.

Figure 2:
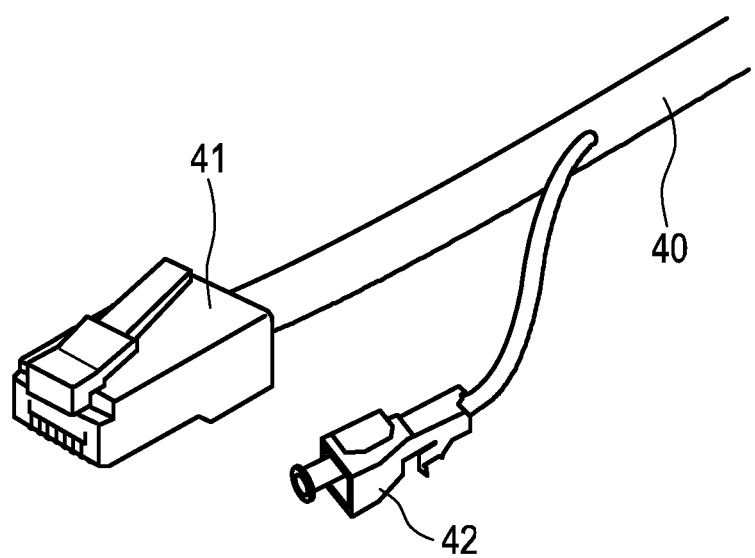
FIG. 2 shows exemplary and schematically a fibre enhanced cable connector according to an embodiment of the present invention.

FIG. 2 shows exemplary and schematically a cable connector for Ethernet cables enhanced with at least one optical fibre that supports transmission of light for data communication. All or some ports on PSEs and/or PDs used in a network supporting optical communication via optical fibres are equipped with circuitry that can facilitate advanced switching behavior in a PSE.

FIG. 2 shows two enhanced cable endings. The optical fibre is assumed to be aligned with the Ethernet wires inside the cable jacket 40. A transparent RJ45 plug 41 is used to convey optical signals into a transparent PSE or PD port. In this embodiment the transparent housing of the plug is used as optical link. In addition another optical connector 42 next to the Ethernet connector 41 could be used, leaving the design of the Ethernet connector 40 and ports unmodified. However, a separate optical connector 42 would be needed. Typically, only one of the two connectors types shown in FIG. 2 would be present in case of a single fibre in the cable.

A PSE connected to such an optically enhanced cable comprises circuitry to process optical data and/or to relay such data on its ports. In this way light can travel through the network from a source to a destination through multiple links, also without intermediate processing by a PSE. It is possible to multicast light to different destinations on the network, or to combine light from different sources in the network to one destination.

Light may travel in both directions through the optical fibres and the supporting devices, e.g. relaying PSE and/or PDs. Light of different wavelengths or signal levels may be used simultaneously. Light may travel over a single fibre or over multiple fibres within a cable.

Figure 3:
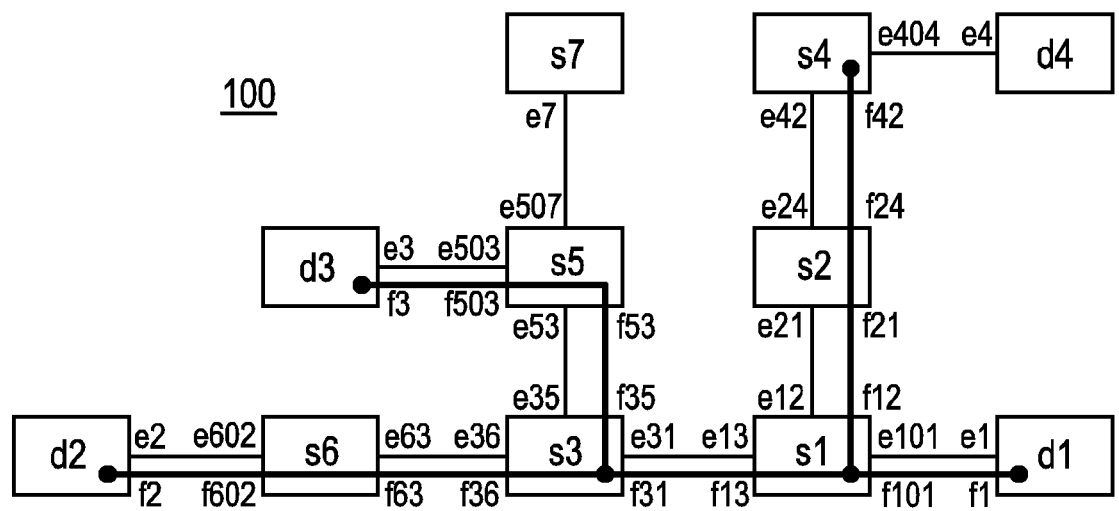
FIG. 3 shows exemplary and schematically a network system according to an embodiment of the present invention.

FIG. 3 shows exemplary and schematically a network system 100 according to an embodiment of the present invention: s1-s7 are PSE devices (switches), d1-d4 are PDs, ei are Ethernet/PoE parts of the connections, and fj are optical parts of connections wherein the index of e and i in FIG. 3 is chosen such, that connections between PSEs are labelled with the respective index number of the devices they connect, e.g. conception between s3 and s5 is labelled e35/e53 or f35/f53. Connections between PSE and PD are labelled at the PSE side with the index of the devices that are connected separated by a 0 and at the PD side simply with the index of the PD, for instance connection between PSE s1 and PD d1 is labelled e/f101 on the PSE side and e/f1 on the PD side.

PSE s1-s6 are provided with additional optical circuitry, s7 is a conventional PoE switch. PDs d1-3 are provided with additional optical circuitry, d4 is a conventional PoE PD.

PSE s2 shows a first exemplary embodiment of a power supplying device according to an embodiment of the present invention. PSE s2 comprises two ports f21 and f24 which are optically directly linked to each other, without further circuitry in the PSE. In general, multiple ports can be (pair-wise) internally linked to each other. Other ports would provide conventional PoE functionality without being optically linked. This allows optical data to be passed through the network without powering the intermediate PSE s2. The data would also pass with high performance, enabling real-time application with higher accuracy than achievable through PoE circuitry.

PSE s3 shows a first exemplary embodiment of a power supplying device according to an embodiment of the present invention. PSE s3 comprises one or more ports that are optically linked to each other (f31, f35, f36). PSE s3 further comprises optical and/or electrical means (not shown) to provide joining or splitting of optical signals (light amplification, spectrum mapping, etc.). Switching means (not shown) may allow or prevent optical signals to be distributed from one port to another port. PSE s3 may optionally further comprise an internal controller and/or software programming means which control advanced usage, processing or scheduling of optical signals. PSE s3 may also allow optical data with high performance properties to be passed through the network without being powered, in particular after a configuration procedure.

The optical components of the PSE s3 may alternately be programmed, controlled or monitored remotely, e.g. via a centralized control unit or a plurality of decentralized control units within the network, through a PoE link or optical link.

PD d2 is an exemplary embodiment of a powered device according to an embodiment of the present invention. PD d2 can receive an optical signal via the connector f2 to trigger a certain action, such as to activate the PD. This may allow a low power consumption of the PD during standby since the PoE circuitry does not have to listen for wake up signals, and/or allows functionality to be operated independent of the PoE circuitry.

The additional fibre connections and respective communication circuitry in the PSEs and PDs may save energy compared to solutions where PSEs and/or PDs have to be activated in order to achieve the same effect, but they can also enable functionality beyond PoE.

The network system as shown in FIG. 3 may exploit optical communication via PDs/PSEs to one or more connected PDs d1-d3 in order to manage accurate timing and/or execute special operations, such as setting a mode of operation independent of the PoE usage. A particular PD/PSE device within the network is supposed to comprise some controlling circuitry. This PD/PSE device may be any of PDs d1-d3 and PSEs s1-s6 and will be referred to as controlling PD/PSE herein below. Possible use cases are:

A controlling PD/PSE wakes up a connected PD/PSE from standby by optical signaling. Accordingly, the PD/PSE can operate in a lower power mode during standby, since they can power down their PoE communication ports and related circuitry. Upon receipt of the optical signal, the PD/PSE may start power negotiation. During power negotiation, the PD/PSE may be powered by a local battery to provide a quick start-up behavior and enable immediate response.

A controlling PD/PSE may also activate a maintenance or self-diagnosis mode in a connected PD. In a network system supporting a lighting application, a concept of urgency or special status may be implemented by a light signal protocol. Independent of PoE communication, such protocol may indicate approaching a deadline for a new sensing period, software update, or maintenance. Such a protocol may use increasing or decreasing light pulses, light levels or color shifting. For example, a passed deadline could be indicated when the frequency of a pulse train increases to the point where a continuous light is being released. Such a light pattern could also be directly visible to users or operators, even if PDs are off or in standby. The controlling PD/PSE may even reset a connected PD by optical signaling, even if the PoE circuitry does not work anymore due to a software crash or unknown state. Optical circuitry may operate independently of Ethernet communication, and emulate a manual operation. As a special case, a validation setup may be created by inducing real-time test conditions in a PoE-based network system. Without having impact on the Ethernet operation and other processes in the system under test, the optical path may simulate error or environmental conditions to a PD or group of PDs. Either a PD can handle such conditions itself (e.g., sensing test lights over fiber), or an additional PD test device is optically controlled to simulate the PD's environment.

Thus, the autonomous optical communication may also provide additional security and/or maintenance functionality and thus enhance the networks robustness.

A controlling PD/PSE emits a real-time control command or notification toward all connected PDs d1-d3. Direct optical paths will guarantee accurately synchronized endpoint behaviors. Connected PDs d1-d3 can have the same or different functionalities. PDs d1-d3 could be sensors at different positions which upon receipt of a corresponding command received via the optical fibre start/stop a distributed sensor reading session. If the network system supports a lighting application, accurate distributed lighting behavior over a large area or large building with many light points can be realized. All light sources connected as PDs may be switched on, switched off or modified (dimming level, scene colors) simultaneously as perceived by users. To this end, PSEs that operate over long distances or that must be reached through many PSE links are connected to a PSE near a light controller through a direct optical path. Local (nearer) PSE connections might still be operated over PoE paths if this causes no noticeable lag in reaction times. PDs need not necessarily be enhanced, and may operate over regular PoE links.

A controlling PD/PSE records real-time information from the connected PDs d1-d3. Direct optical paths from a connected PD to the controlling PD through a number of PSE links allows accurate, timestamped, distributed sensing or event detection. Additional data belonging to such events can be passed through PoE paths and bound to the events or logs by an ID or source address.

A controlling PD/PSE prevents drifting of a local clock on a connected PD by optical timing signals. As an example, a sensor has a local battery and turns itself on once every few minutes to report a measurement with an added timestamp (over the electrical wires). The timing signal could simply be a light intensity (e.g., 10% between 4 AM and 6 AM, 20% between 6 AM and 8 AM) or a bit pattern. (The sensor battery could be charged by the PoE link.)

In the exemplary network system shown in FIG. 3 redundant paths can be created in the network, where otherwise circular paths would not be allowed. This can be useful in circumstances where communication between PSEs/PDs should be more robust than is typical for networks. By using optical links in enhanced cables separate from PoE links in regular and/or enhanced cables, a hybrid topology can be created in an otherwise tree topology network (for a part of the network). Enhanced PSEs could be configured such that some ports only support the optical logic and possibly the PoE power transport part, thereby preventing Ethernet protocol conflicts due to otherwise circular paths in the network.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A powered device for use in a Power over Ethernet system, comprising:
  a first port to receive transmissions via electrical wires, wherein the transmissions received via the first port is power and/or data transmissions,
  a second port to receive optical signals, and
  circuitry to process a command received with an optical signal,
  wherein the powered device operates in a low power state and the command received in the optical signal is a wake up signal and the circuitry is configured upon receipt of the wake up signal to change the power state of the powered device and submit a power request to initiate power negotiations of the powered device.

2. The powered device according to claim 1, further comprising a battery to provide power to the powered device upon receipt of the wake up signal and during power negotiations.

3. A network system supporting optical and electrical signal transmission comprising a power supplying device for a Power over Ethernet system wherein the power supplying device comprising:
  a first port to receive transmissions via the electrical wires, wherein the transmissions received via the first port is power and/or data transmissions;
  a second port to send transmissions via the electrical wires,
  a third port to receive optical signals, and
  a fourth port to transmit optical signals,
  wherein the third and the fourth port are directly linked to each other; and the network system further comprising a powered device having,
    a first port to receive transmissions via electrical wires, wherein the transmissions received via the first port is power and/or data transmissions,
    a second port to receive optical signals, and
    circuitry to process a command received with an optical signal,
    wherein the powered device operates in a low power state and the command received with the optical signal is a wake up signal and the circuitry is configured upon receipt of the wake up signal to change the power state of the powered device and submit a power request to initiate power negotiations of the powered device, and,
  wherein the power supplying device is adapted to relay the optical signal to the powered device.

4. The network system according to claim 3, wherein the power supplying device further comprising circuitry to split an optical signal received via the third port and transmit the signal via the fourth and a fifth port.

5. The network system according to claim 3, wherein the power supplying device further comprising a fifth optical port to receive an optical signal and circuitry to combine optical signals received via the third and the fifth ports and transmit the combined signal via the fourth port.

6. The network system according to claim 3, wherein the circuitry is programmed, controlled or monitored by a remote device connected via data communication via the electrical wires or via an optical link.

7. The network system according to claim 3, wherein the powered device is adapted to receive control information in a low power mode via the optical signals, wherein the control information comprises a wake up signal and the powered device comprises circuitry to process the wake up signals and initiate power negotiations with the power supplying device.

8. The network system according to claim 7, further comprising a local battery to provide power to the powered device during power negotiations.

9. The network system according to claim 3, wherein the system comprises a plurality of powered devices including the powered device and a plurality of power supplying devices including the power supplying device, wherein the plurality of powered devices and the plurality of power supplying devices are connected via electrical connections according to a first network topology and connected via optical connections according to a second network topology.

10. The network system according to claim 3, wherein the system comprises a plurality of powered devices including the powered device, and wherein the control information is provided simultaneously to the plurality of powered devices via the optical connections.

* * * * *